United States Patent [19]
Ozark et al.

[11] Patent Number: 5,494,249
[45] Date of Patent: Feb. 27, 1996

[54] CONTAINER HOLDER FOR VEHICLE WALL PANEL

[75] Inventors: L. John Ozark, Grosse Pointe Woods; Michael G. Moore, Shelby Township, both of Mich.

[73] Assignee: Chrysler Corporation, Highland Park, Mich.

[21] Appl. No.: 313,503

[22] Filed: Sep. 26, 1994

[51] Int. Cl.⁶ .............................. A47G 29/00; B60R 7/00
[52] U.S. Cl. .................................. 248/311.2; 248/284.1; 224/926
[58] Field of Search ............................ 248/311.2, 293, 248/278; 224/926, 282, 557, 556, 555; 297/188.16, 188.15, 188.1, 188.01

[56] References Cited

U.S. PATENT DOCUMENTS

| | | | |
|---|---|---|---|
| 4,056,017 | 11/1977 | Cobb | 224/282 X |
| 4,191,350 | 3/1980 | Ormond | 248/293 |
| 4,530,480 | 7/1985 | Pratt | 248/311.2 |
| 4,712,823 | 12/1987 | Mills et al. | 296/37 |
| 4,733,908 | 3/1988 | Dykstra et al. | 248/311.2 X |
| 4,824,159 | 4/1989 | Fluharty et al. | 248/278 X |
| 4,907,775 | 3/1990 | Lorence et al. | 248/311.2 |
| 4,955,571 | 9/1990 | Lorence et al. | 248/311.2 |
| 5,060,899 | 10/1991 | Lorence et al. | 248/311.2 |
| 5,191,679 | 3/1993 | Harper | 16/363 |
| 5,330,146 | 7/1994 | Spykerman | 248/311.2 |
| 5,342,009 | 8/1994 | Lehner | 248/311.2 |
| 5,346,168 | 9/1994 | Astrella | 248/278 |

Primary Examiner—Karen J. Chotkowski
Attorney, Agent, or Firm—Thomas G. Pasternak

[57] ABSTRACT

A container two-element holder assembly, comprising a container holder plate and a hinge link, arranged for substantially flush retracted storage in a vehicle panel recess wherein each element has an internal side lying in a common plane juxtaposed the recess backwall. The hinge link is supported to the backwall about a first pivot axis whereby the holder assembly is adapted for conjoint ninety degree swinging movement about the first pivot axis through a side opening in the recess to an intermediate mode. The holder plate is pivotally connected to the hinge link for rotational movement about a second pivot axis, orthogonal to the first axis, through an angle of ninety degrees from its intermediate mode to a use mode. In the use mode the holder plate internal side, formed with a cavity, faces upwardly for receiving and supporting a beverage container in the cavity.

10 Claims, 2 Drawing Sheets

CONTAINER HOLDER FOR VEHICLE WALL PANEL

BACKGROUND OF THE INVENTION

This invention relates to beverage container holders and more particularly to a container holder or "cupholder" for an automotive vehicle or the like which is storable in a flush manner within a conforming recess formed in a vehicle wall panel.

The prior art is replete with beverage container holders offered as original equipment on automotive vehicles. Such holders are typically integrated into an armrest, console, side panel, or the like. One example of such a vehicle beverage container holder is disclosed in U.S. Pat. No. 4,733,908 issued Mar. 29, 1988 to Dykstra et al. The '908 patent shows a support housing for a container holder having a recess receiving the holder in a folded storage mode adapted to unfold from the housing to define an extended holder in-use mode. The holder member includes a pair of arcuate foldable members which unfold in a plane orthogonal to the movement of the container holder member with respect to the recess.

The U.S. Pat. No. 4,712,823 issued Dec. 15, 1987 to Mills et al. discloses a cup holder belt into a vehicle trim structure such as a door trim panel so as to be incorporated as an integral part of the vehicle's interior and minimize bulk, attachment and support requirements. The cup holder comprises two plate members having edges which are connected to each other by a hinge, and opposite edges which are connected to a housing carried in the trim panel. One plate covers an access opening to the housing in the trim panel and movement thereof carries the second plate from a stowed position behind and parallel with the first plane to a cup supporting position in which the second plate projects horizontally form the trim panel.

The U.S. Pat. No. 4,530,480, issued Jul. 23, 1985 to Pratt, discloses a collapsible cup holder adapted for permanent securement to an appropriate supporting surface. The Pratt reference teaches a U-shaped collapsible holder assembly to support the weight of the container and a U-shaped collapsible retaining assembly to maintain the container in the desired position.

The U.S. Pat. No. 5,191,679, issued Mar. 9, 1993 to Harper, discloses a collapsible beverage holder which can be maintained in a receiving position when in use and which can be folded down when not in use.

The U.S. Pat. No. 5,342,009, issued Aug. 30, 1994 to Lehner, discloses a vehicle installed retractable holding device for drink containers having a fastening panel with a tray supported thereto adapted to be folded-out for receiving the bottom of the container. An annularly shaped holder is supported above the tray on the fastening panel to pivot between a folded-out position and a retracted position.

SUMMARY OF THE INVENTION

It is a feature of the present invention to provide a retractable beverage container holder arrangement including a two-element container holder assembly arranged for generally flush retracted storage in a panel recess for conjoint swinging movement about a first pivot axis of a hinge link element from its storage mode in the recess to a predetermined intermediate mode wherein a second container holder plate element is pivoted downwardly, relative to the hinge link element, to a use mode about a second pivot axis oriented orthogonal to the first pivot axis.

It is another feature of the present invention to provide a retractable beverage container holder arrangement as set forth above wherein the holder assembly comprises a hinge link pivotally connected to a holder plate enabling rotation of the holder plate relative to the hinge link about the second pivot axis. The hinge link and the holder plate elements each have opposite internal and external sides such that, when the elements are retracted to their storage mode, each element internal side lies in a common plane juxtaposed the recess backwall. The first pivot means connects the hinge link to the backwall whereby the assembly is adapted for conjoint swinging movement about the first pivot axis through an arc of ninety degrees whereupon the hinge link contacts a recess wall portion which provides a stop.

It is a further feature of the invention to provide a container holder arrangement as set for above wherein the holder plate is adapted for rotation about the second pivot axis from its intermediate mode through substantially ninety degrees whereby a stop device of the second pivot means is operative for positioning the holder plate in a horizontally extended use mode wherein its internal side, formed with a container receiving cavity, faces upwardly adapted for receiving and holding a container.

It is still another feature of the present invention to provide an automotive vehicle container holder arrangement as set forth above wherein the body panel recess has an open front face and a recess side opening in a panel side edge through which the assembly pivots between its storage mode and its intermediate mode.

BRIEF DESCRIPTION OF THE DRAWINGS

These and other objects, features and advantages of the invention will appear from the following written description and the accompanying drawings in which.

DETAILED DESCRIPTION OF THE INVENTION

Figure 1:
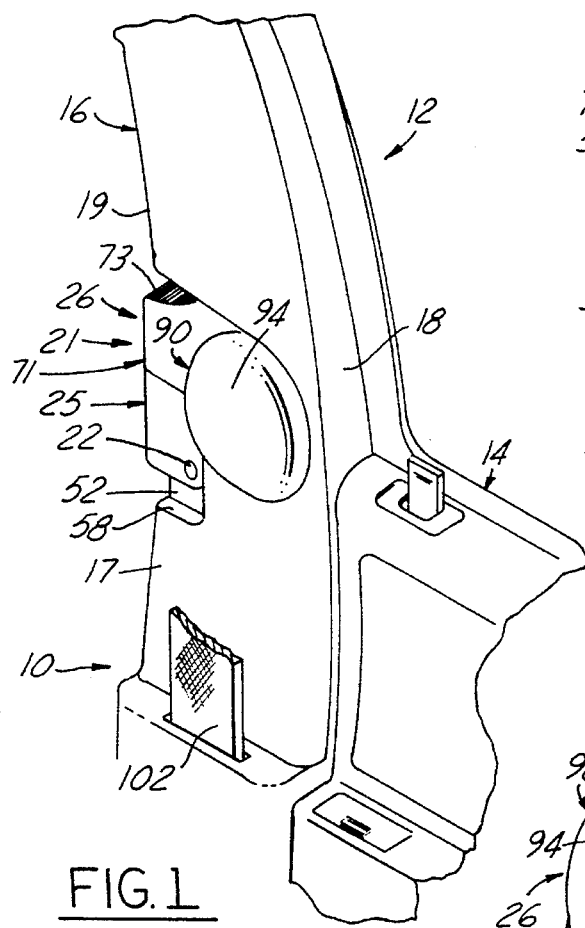
FIG. 1 is a fragmentary perspective interior view of an automotive vehicle pillar with parts broken away, showing the beverage container holder of the present invention in its storage mode folded-up in a pillar recess.

Referring now to the drawings and in particular to FIG. 1 there is shown an interior portion 10 of a vehicle passenger compartment such as, for example, a minivan. A vertically extending left hand door or "B" pillar 12 partially defines a side door opening closed by a door 14.

Figure 2:
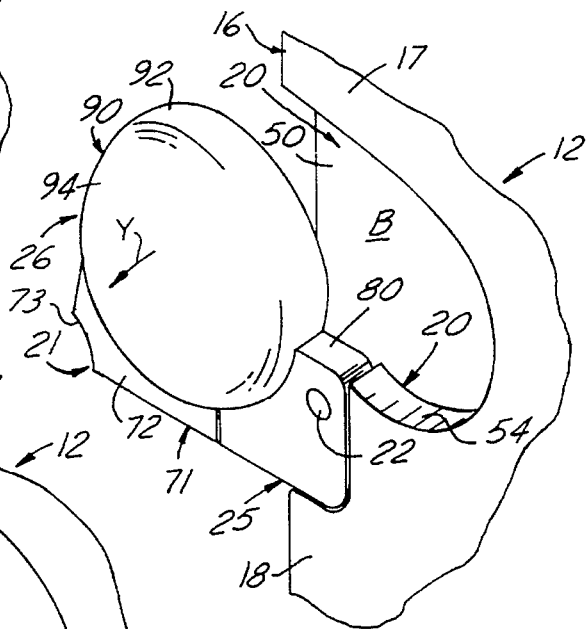
FIG. 2 is a fragmentary enlarged perspective interior view of the automotive vehicle similar to FIG. 1 sequentially showing the container holder assembly swung down ninety degrees to its intermediate mode.
Figure 4:
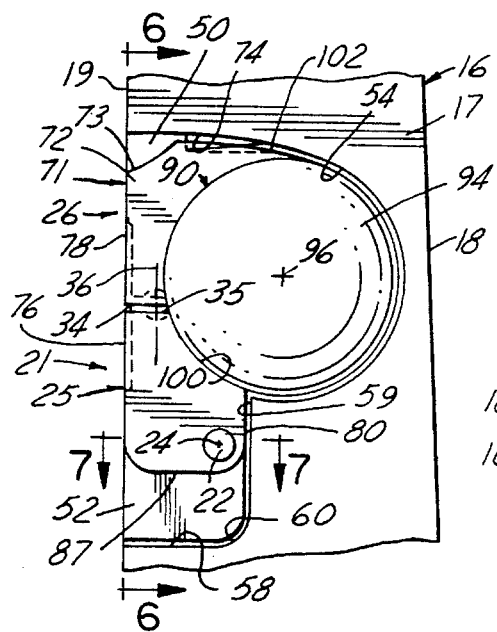
FIG. 4 is a fragmentary front view of the container holder assembly shown in its FIG. 1 stored mode.
Figure 5:
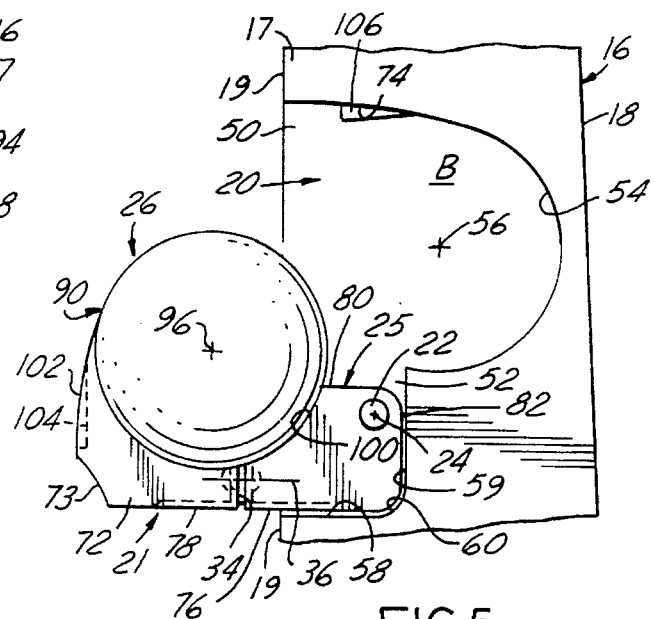
FIG. 5 is a view similar to FIG. 4 showing the container holder assembly pivoted downwardly ninety degrees to its intermediate mode.

With reference to FIG. 2 the interior side of the door pillar 12 comprises a support member shown in the disclosed embodiment as a plastic trim panel 16, molded from suitable plastic material. The panel provides an upright interior facing front surface 17 having forward end and aft end edge surfaces 18 and 19, respectively. As best seen in FIGS. 4 and 5 the panel has recess means molded therein which in the disclosed embodiment comprises a recess 20 having a generally P-shaped open front face. The recess provides space for the substantially flush storage of a two-element container holder assembly, generally indicated at 21. It will be noted that the holder assembly is pivotally supported on the panel 16 by first pivot means in the form of a fastener 22. In the disclosed embodiment the fastener is a rivet having its shank 23 defining a holder assembly first pivot axis 24.

Figure 3:
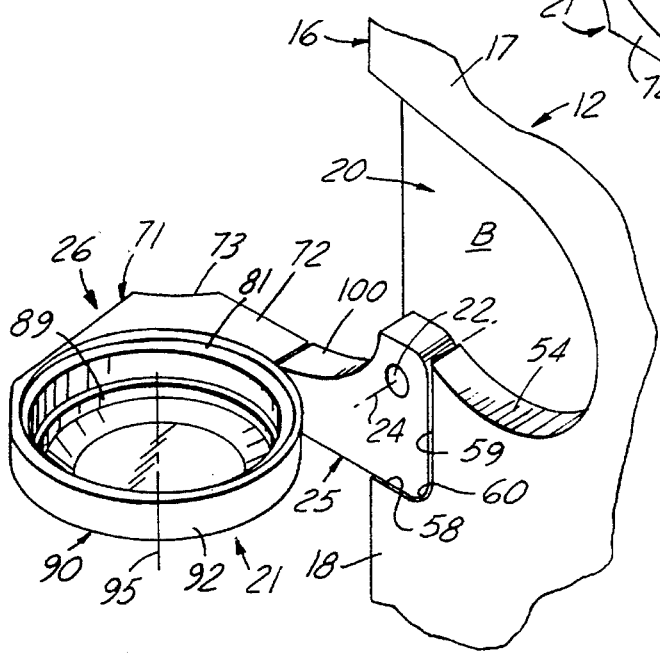
FIG. 3 is a view similar to FIG. 2 showing the beverage container holder plate pivoted downwardly ninety degrees from its FIG. 2 intermediate position to its horizontally extended use mode.
Figure 8:
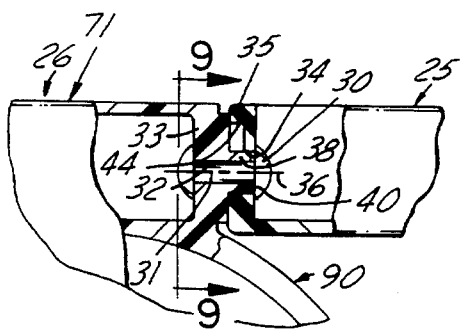
FIG. 8 is an enlarged fragmentary horizontal sectional view taken substantially along the line 8—8 of FIG. 3.

As seen in FIG. 5 the holder assembly 21 comprises a generally rectangular-shaped hinge link 25 and a generally disc-shaped holder plate 26. With reference to FIG. 8 the hinge link 25 and the holder plate are shown interconnected by second pivot means in the form of fastener 30. The fastener 30 in the disclosed embodiment is shown as a rivet having a shank 31 extending through a bore 32 in holder plate shoulder wall 33 and aligned bore 34 in juxtaposed abutting relation to end wall 35 of the hinge link 25. The second pivot means comprises a second stop arrangement enabling the holder plate 26 to rotate substantially ninety degrees relative to the hinge link 25 about a second pivot axis 36, defined by the rivet shank principal axis 31, from a retracted stored mode in recess 20 (FIG. 4) to an intermediate swing-out mode (FIG. 3).

Figure 9:
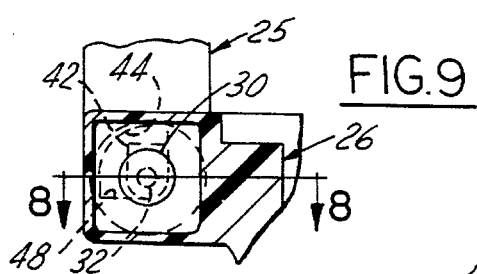
FIG. 9 is fragmentary vertical sectional view, partly in elevation, taken on the line 9—9 of FIG. 8.
Figure 10:
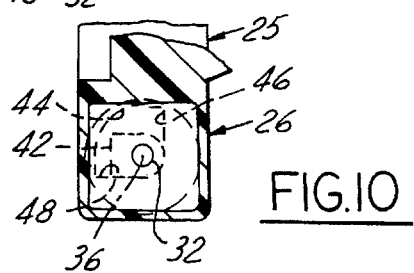
FIG. 10 is a fragmentary sectional view similar to FIG. 9 showing the container holder plate rotated ninety degrees to its use mode.
Figure 11:
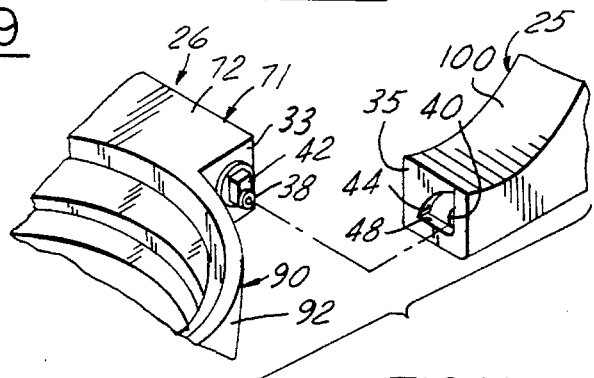
FIG. 11 is a fragmentary exploded view showing the pivotal connection and stop arrangement of FIGS. 8–10.

With reference to FIGS. 8–11 the holder plate shoulder wall 33 is formed with an axially extending stem portion 38 adapted for journalled reception in an axial bore 40 extending through the hinge link end wall 35. The stem portion 38 is formed with a radial key 42 sized for reception in a "pie-shaped" ninety degree cutout 44 defining a ninety degree quadrant formed in the hinge link end wall 35. As best seen in FIGS. 9 and 10 the radial key 42 is adapted for ninety degree rotational movement about the second pivot axis 36 within the hinge link cutout 44. As depicted in FIGS. 3 and 9 with the key 42 oriented vertically one side contacts cutout vertical stop 46 while with the key 42 in its FIGS. 5 and 10 horizontal position the key opposite side contacts cutout horizontal stop 48.

FIG. 5 shows the panel recess 20 having an open front face and defined in plan by a generally P-shaped recess upstanding backwall, indicated generally at "B". The backwall "B" comprises an upper holder plate storage area 50 and a lower hinge link storage area 52 (FIG. 4). The upper storage area 50 is shown formed in part by a half-round pocket, defined by arcuate recess peripheral wall 54, with pocket having a center of curvature 56 located a predetermined dimension inward from the panel aft side surface 19. The backwall lower area 52 has a generally rectangular-shape defined by a horizontally extending lower recess peripheral wall 58 and a vertically extending recess peripheral wall 59 with the walls 58 and 59 intersecting at a common radiused juncture 60.

Figure 7:
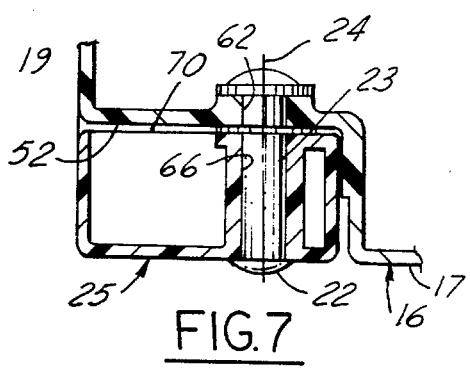
FIG. 7 is an enlarged fragmentary horizontal sectional view, partly in elevation, taken substantially on the line 7—7 of FIG. 4.

As viewed in FIG. 7 the backwall lower area 52 has a bore 62 therein through which the rivet shank 23 of the first pivot means extends. The shank 23, which is also shown inserted through an aligned hinge-link bore 66, defines the first pivot axis 24 shown in FIG. 4 which extends normal to the backwall "B" whereby the first pivot axis 24 is oriented orthogonal to the second pivot axis 36.

Figure 6:
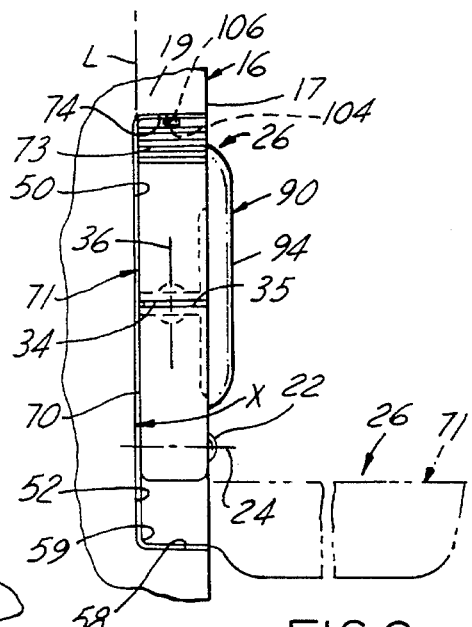
FIG. 6 is a fragmentary side view looking in the direction of line 6—6 of FIG. 4.

It will be noted in FIG. 6 that in the beverage container holder stored mode hinge-link internal side 70 and holder plate internal side 71 are coplanar. The vertically disposed plane which includes sides 70 and 71, indicated by dashed-line "L", is in juxtaposed parallel relation to the recess backwall "B". The pivot shank 23 permits conjoint arcuate downward swinging movement of the elements 25 and 26 in a counter-clockwise direction shown by an arrow "Y" in FIG. 2. It will be noted that the hinge link 25 and the holder plate 26 assembly are adapted to swing through a determined arc of ninety degrees about the first pivot axis 24 from the "stored mode" of FIG. 4 to an "intermediate mode" of FIG. 5.

It will be seen in its FIGS. 1 and 4 that an upper generally fillet-shaped corner portion 72 of the holder plate 26 has its corner juncture radiused-out providing a concave serrated finger grip 73 for manually swinging the assembly downwardly. The finger grip 73 allows a user to readily swing the assembly 22 conjointly counter-clockwise through a support panel recess rectangular-shaped aft or side face opening indicated by arrow "X" in FIG. 6. The aft "X" is defined in the panel aft surface 19 by three edge junctures, i.e. by upper recess wall 74, lower recess wall 58 and recess backwall "B". In the stored mode of FIG. 4 it will be seen that hinge link aft edge 76 and holder plate aft edge 78 are in vertically disposed coplanar relation, defining a common plane with the panel vertical aft surface 19, thereby closing the panel side opening "X" except for a small clearance portion of the recess area 52 adjacent its lower wall 58.

With the conjoint swinging of the assembly 22 about pivot axis 23 to the intermediate mode of FIG. 3 it will be seen that hinge link inboard edge 80 is horizontally disposed while its bottom edge 82 is in vertically disposed flush contact with stop means in the form of recess stop wall 59. Because the hinge link bottom edge 82 abuts the recess vertical stop wall 59 the counter-clockwise conjoint swinging travel of the assembly 22 is limited to ninety degrees. Upon the operator pivoting the holder plate 26 downwardly from its FIG. 5 "intermediate mode" to its FIG. 3 "use mode" the holder plate internal side 71 is positioned in a substantially horizontal plane. The internal side 71 is shown in FIG. 3 provided with container receiving means which in the present embodiment is an annular upwardly facing cavity 88 having one or more concentric stepped ribs 89 adapted to receive and hold containers of varying diameter.

As best seen in FIGS. 3 and 6, the container holder plate comprises the fillet shaped corner portion 72 formed integral with a disc-shaped portion 90. The disc-shaped portion is defined by a cylindrically-shaped peripheral barrier or wall 92 concentrically disposed about disc principal axis 95 with the axis 95 shown vertically disposed in FIG. 3. The cavity 88 is closed by a slightly dome-shaped wall plate 94 with the wall plate 94 having its center 96 aligned on the disc principal axis 95.

With reference to FIGS. 4 and 5 it will be seen that upon upward swinging of the hinge link 24 and container holder plate 26 to the stored mode results in the disc portion 90 being seated in the recess half-round pocket by virtue of the disc center 96 being aligned with the recess half-round wall 54 center of curvature 56. It will be noted in FIG. 4 that the plate corner portion 72 is so shaped and sized as to fill the remaining upper backwall area with the holder plate 90 in its storage mode. FIG. 4 shows the corner portion 72 formed with the lower horizontally disposed end shoulder 34 positioned in opposed juxtaposed relation to the end abutment 35 of the hinge link 24.

In FIGS. 4 and 6 it will be seen that the corner portion 72 has its upper lead-in arcuate edge surface.

It will be observed in FIGS. 3 and 4 that the hinge link 25 has an arcuate corner segment 100 providing a complementary opposed mating concave surface accommodating a coextensive convex portion of the disc cylindrical-shaped peripheral wall 92.

In FIG. 4 it will be seen that the corner portion 72 has its lead-in arcuate edge surface 102 formed with an elongated groove 104. The groove 104 is positioned and shaped so as to slidably receive therein a wedge-shaped tongue shown at 106 in FIG. 5 depending from the upper recess wall 74. Thus, upon the holder assembly 21 being pivoted upward to its stored mode of FIG. 4 the tongue 106 interlocks with the groove 104, as seen in FIG. 6. As a result the holder plate 26 is prevented from pivoting about the pivot axis 36 while in its stored mode. With reference to FIG. 1 the it will be appreciated that because the container holder assembly 21 is substantially flush with the panel side surface 17 in its storage mode the holder assembly does not present an obstruction within the vehicle cabin. As a consequence stored container holder assembly 21 does not interfere with the free running of a vertically extending safety belt 102 when stowed adjacent the panel front surface 17.

While the principles of the present invention in connection with the specific test device has been described, it is to be understood the foregoing detailed description has been made by way of example only and not as a limitation to the scope of the invention as set for in the accompanying claims.

What is claimed is:

1. A container holder arrangement for a vehicle comprising:

a vehicle passenger compartment support having a recess therein defined in part by an upstanding backwall;

a container holder two-element assembly comprising a hinge link and a container holder plate, each having opposite internal and external sides, pivotally supported on said recess backwall in a retracted stored mode with wherein each said hinge link and said holder plate internal side lying in a common plane juxtaposed said backwall;

first pivot means connecting said hinge link to said backwall, said first pivot means defining a first pivot axis extending normal to the plane of said backwall;

second pivot means interconnecting said hinge link and said holder plate, said second pivot means defining a second pivot axis extending orthogonal to said first pivot axis;

said hinge link and said holder plate adapted for conjoint swinging travel about said first axis from said storage mode to an intermediate mode wherein a first stop arrangement limits said assembly travel to substantially ninety degrees;

said holder plate adapted for rotation relative to said hinge link about said second axis from its intermediate mode through substantially ninety degrees, whereby a second stop arrangement operative for positioning said holder plate in a horizontally extending use mode, and wherein said holder plate internal side provided with container receiving means adapted for receiving and holding a container.

2. The container holder arrangement as set forth in claim 1 wherein said first stop arrangement comprising one recess wall portion adapted to contact an edge of said hinge link in said intermediate mode and wherein another recess wall portion adapted to contact an edge of said holder plate in said storage mode.

3. The container holder arrangement as set forth in claim 1 wherein said second stop arrangement comprising a key fixed on said holder plate and extending radially from said second pivot axis, said key adapted for pivotal movement with said holder plate about said second pivot axis within a ninety degree quadrant-shaped cutout on said hinge link, said cutout defining an intermediate mode key stop and a use mode key stop.

4. The container holder arrangement as set forth in claim 1 wherein said container receiving means in the form of an annular cavity formed in said holder plate interior surface.

5. The container holder arrangement as set forth in claim 4 wherein said locking means comprising a tongue adapted for interlocking positioning in a complementary groove.

6. The container holder arrangement as set forth in claim 1 wherein locking means are provided preventing the holder plate from pivoting about said second pivot axis upon said assembly being moved to said stored mode.

7. The container holder arrangement as set forth in claim 1 wherein said recess backwall being generally P-shaped.

8. The container holder arrangement as set forth in claim 1 wherein said holder plate comprising a disc-shaped portion formed integral with a fillet-shaped corner portion;

said recess backwall being generally P-shaped in plan comprising an upper holder plate storage area formed in part by a half-round pocket defined by an arcuately extending recess wall portion, said half-round pocket having a center of curvature located a predetermined dimension from an aft side surface of said panel;

said backwall further comprising a generally rectangular-shaped lower hinge link storage area having a bore therein through which a first fastener shank of said first pivot means extends together with an aligned bore in said hinge link, wherein said first fastener shank having its principal axis defining said first pivot axis;

whereby upon upward swinging said two-element assembly from said intermediate mode resulting in said hinge plate disc portion having a section thereof received in a conforming manner in said recess half-round pocket with said disc portion having its center located in alignment with said recess half-round wall center of curvature.

9. The container holder arrangement as set forth in claim 1 wherein said hinge link having a generally rectangular-shape;

said recess backwall lower storage area being generally rectangular-shaped defined by a horizontally extending lower recess peripheral wall portion and a vertically extending recess peripheral wall portion intersecting at a common radiused juncture; and whereby and said recess stop portion defined by said horizontally extending lower recess peripheral wall portion.

10. The container holder arrangement as set forth in claim 9 wherein said holder plate comprising a generally disc-shaped element and said hinge link comprising a generally rectangular-shaped element;

said backwall lower area having a bore therein through which a first fastener shank of said first pivot means extends, said shank also extending through an aligned hinge-link bore, said first fastener shank having its principal axis defining said first pivot axis extending normal to said backwall;

said holder plate having a shoulder wall and said hinge-link having an end wall abutting said shoulder wall, said shoulder wall and said end wall having aligned bores through which a second fastener shank of said second pivot means extends, said second fastener shank having its principal axis defining said second pivot axis.

* * * * *